United States Patent [19]
Von Ehr, II et al.

[11] Patent Number: 5,434,959
[45] Date of Patent: Jul. 18, 1995

[54] SYSTEM AND METHOD OF GENERATING VARIABLE WIDTH LINES WITHIN A GRAPHICS SYSTEM

[75] Inventors: James R. Von Ehr, II, Plano; John B. Ahlquist, Jr., Garland; Samantha Seals-Mason, Plano, all of Tex.

[73] Assignee: Macromedia, Inc., San Francisco, Calif.

[21] Appl. No.: 833,957

[22] Filed: Feb. 11, 1992

[51] Int. Cl.$^6$ .............................................. G06T 11/80
[52] U.S. Cl. ..................... 395/141; 395/143; 395/133; 395/138; 395/150
[58] Field of Search ................ 395/140–143, 395/127, 129, 132, 133, 138, 139, 150, 151, 155, 161, 275; 382/55; 358/284; 345/163, 168, 171, 179

[56] References Cited

U.S. PATENT DOCUMENTS

| | | | |
|---|---|---|---|
| 4,601,002 | 7/1986 | Rosenthal | 382/55 X |
| 4,612,540 | 9/1986 | Pratt | 358/284 X |
| 4,748,443 | 5/1988 | Uehara et al. | |
| 5,073,957 | 12/1991 | Seto et al. | 382/22 |
| 5,101,436 | 3/1992 | De Asuiar et al. | 382/22 X |
| 5,155,813 | 10/1992 | Donoghue | 395/275 |
| 5,268,993 | 12/1993 | Ikenoue et al. | 395/114 |
| 5,293,472 | 3/1994 | Lotspiech | 395/143 |

OTHER PUBLICATIONS

Fontographer Software Package Version 3.5 Documentation Copyright ©1992 Altsys Corporation.
Aldus ®FreeHand TM 1.0, Jan. 1988 (Documentation).

*Primary Examiner*—Almis R. Jankus
*Attorney, Agent, or Firm*—Winstead Sechrest & Minick

[57] ABSTRACT

A video graphics system and method for creating variable width lines such that the lines may be easily edited. As a line image is created, a center point of that image along its length is temporarily established having width information at various points. This width information is used to create an outline of image of the desired shape, the outline having point data spaced at intervals. This point data can then be edited by a user to create different shapes. In situations where a pressure sensitive stylus is used to create the variable length line, a look-back technique is employed to insure that the line remains wide at the end point even though the user is reducing pressure as the system is removed from the pad.

89 Claims, 6 Drawing Sheets

SYSTEM AND METHOD OF GENERATING VARIABLE WIDTH LINES WITHIN A GRAPHICS SYSTEM

TECHNICAL FIELD OF THE INVENTION

This invention relates to graphics software and more particularly to a system and method for generating variable width lines by using pressure sensitive techniques or simulations thereof.

BACKGROUND OF THE INVENTION

In traditional artistic endeavors, an artist creates attractive visual effects by using a paintbrush to create lines, strokes or paths that have different widths along its length. The artist would traditionally accomplish this by varying the pressure, or the angle, of the moving brush. In computer graphics, variable line widths are not easy to achieve and when achieved are not easily changed.

For the most part existing graphics systems allow users to construct constant width paths by moving a pen (or mouse) over a pad. Such existing graphics software systems generally approximate varying width lines by forcing the user to create a path which describes the width boundaries of the desired stroke. The system then fills in between the boundaries to create the image of the variable width line.

Currently there are two major divisions between kinds of graphic software systems, one of which is generally referred to as raster or paint systems, and the other major division being vector based or outline based graphics software systems.

In the raster based systems, images are created by composing thousands of tiny dots. The advantage of this is that it allows for very free expression but it is very hard to edit discrete shapes once the initial line is drawn.

In raster systems, it is possible to approximate a traditional paintbrush effect by using a pressure sensitive pen which creates a range of dots across the screen. The problem is that when the user is finished drawing the line, it is very hard to go back and fine tune the shape because the image consists of a plurality of disconnected dots. Essentially, each created dot must be individually modified to create a different shape.

A vector based system describes shapes by a series of mathematical outlines. For example, a circle would be described as the mathematical outline of a circle along with an instruction that it should be filled. Using traditional vector graphics programs, a user would describe a variable width line but would have to think about what the boundary, i.e., the outline, of that final shape would be. These systems run counter to traditional artistic techniques and do not follow the normal mind flow of an artist.

Accordingly, one problem with the prior art graphics systems is that they are very difficult to use to obtain a traditional artist effect.

A further problem is that existing systems do not allow artists to create images in a manner which parallels their traditional training, i.e., by moving a paintbrush (stylus) over a pad.

Another problem with the prior art is that once a line has been created, it is very difficult to change that line and to create different graphic images of the width characteristics of the line.

A further problem exists when variable width lines are being created by a pressure stylus since at the end of the line the user would normally lift up on the stylus, thereby reducing the pressure. In a logical format then the line at the end would always become very thin because thin lines are a result of low pressure on the stylus. Thus, there is a need for a system which creates wide lines by heavy pressure on a stylus (pen) which allows a user to pick up on the pen at the end of the line and not create a very thin line.

SUMMARY OF THE INVENTION

These problems and others have been solved by graphics presentation software consisting of a system and method of generating variable width lines which in one embodiment, utilizes the force exerted on a surface to control the width of the line as the line is being generated. In this system the line is created in such a manner that it can be edited easily at any point to change the width. This editing function is controlled by traditional graphics editing techniques which rely upon the particular format followed by the initial line creation.

The system operates such that as the user moves a pen (or operates a key pad and mouse) a line image is created which contains direction and width information. The path shape information along with the variable width data (obtained by the pressure of the pen or by key pad data) is used to construct an actual boundary shape similar to one that the user desires. Thus, while in prior art systems, the outline must be created first, then filled in, this graphics system operates in the exact opposite manner such that the line width is created first, and then the outline formed from the line width. It is the creation of the outline then that allows for the easy editing of the image. Once the outline is created, there are a number of points created pertaining to the shape of the line and the width of the line at that point. Any one of these points then can be edited to change the line characteristics.

When the line is first created, the system operates to store the center line and the width at various points along the center line. It is from this stored data that points are created which form the outline for display to the user.

The system is designed to prevent the line from always becoming thin when pressure is removed as a user is releasing pressure at the natural end of a stroke. This system relies on a special filtering technique which compares the relative movement and pressure change of the stylus. Depending upon certain criteria, some information that is received from the stylus regarding pressure or location changes may be ignored. The system uses a look-back technique to see where the last several points were and what their thickness was to determine whether it looks like the user is really trying to make a thinner line or whether the user is, in fact, removing the pen from the pad.

Thus, one technical advantage of our system is that a user can move a stylus across a pad and by pressing harder, or softer, can create variable lines having variable widths.

Another technical advantage of our system is the creation of a graphics system which, depending upon line width information, creates an outline of the desired line in image format on a screen, such that the image contains points editable for controlling subsequent outlines of images.

A still further technical advantage is that our system allows a user to move a stylus across a pad to create an image of the line and to sense the pressure of the stylus at any point to create variable thickness lines.

A still further technical advantage of our system is to monitor the pressure and direction data from a stylus to create the proper width of the line at the end point of the line even though the user was in the process of reducing pressure on the stylus.

A still further technical advantage of our system is the ability to generate a font having variable width segments and to display the font on a video terminal or a printer.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

In order to produce the variable width lines as described in the present invention, the reader is recommended to purchase the "FONTOGRAPHER" software from Altsys Corporation, 269 W. Rennet Road, Richardson, Tex. 75080, hereby incorporated by reference herein. With this software, a user may produce fonts for printing composed of the variable width lines.

Figure 1:
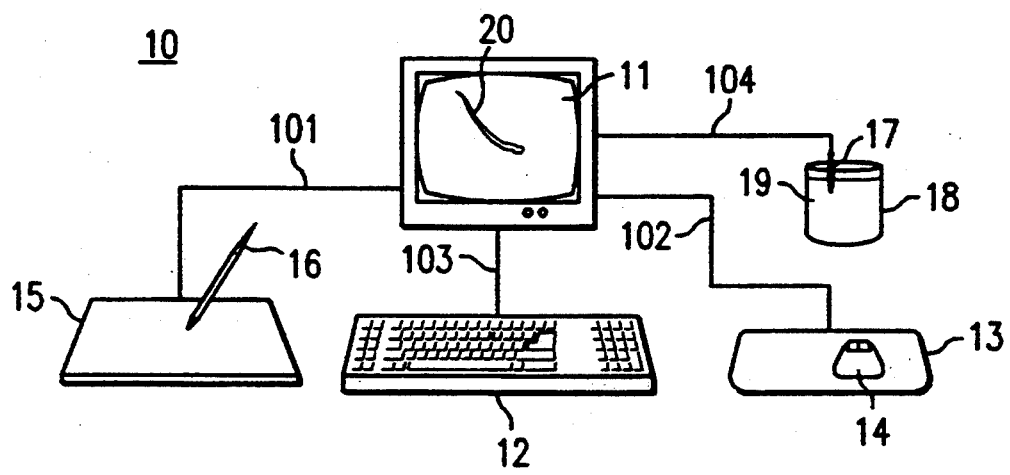
FIG. 1 shows an overall system of the embodiment in which the invention could possibly reside.

Turning first to FIG. 1, there is shown a system 10 which has in it, in one example, a computer graphics display 11 and keypad 12. Also connected to the computer graphics display 11 is mouse 14 with its associated pad 13 and also connected to the computer graphics display 11 is pressure sensitive tablet 15 and its associated pen 16 and also connected to the computer graphics display 11 is a reservoir 18 containing a fluid 19 with its associated stylus 17. Displayed on the screen is an image 20 having a variable width from beginning to end. This image can be created in any number of different ways, either from the keypad and from a mouse or from a pressure sensitive tablet or from a stylus with a fluid-filled reservoir. In addition, there are many other methods in which such a image can be created using the principles of our invention.

If the image were to be created using pressure sensitive tablet 15 and pen 16, the user would grasp the pen 16 and proceed to move the pen 16 across the pressure sensitive tablet 15. The variable width of the line is described by using the pressure sensitive tablet 15 in two forms. The current position (or direction) of the line is represented by the user moving the pen 16 over the tablet 15 and is represented by the position of the pen 16 on the tablet 15. Simultaneously the user may vary the width of the line at any point by changing the pressure of the pen 16 on the tablet 15. This allows the user to simultaneously vary both the position and width of the line. This is one of the most fluid and simple techniques for the user to specify a variable width shape and follows the most natural inclination of an artist. One possible alternative method for the user to specify a variable width shape would be to use the mouse 14 and keypad 12 in conjunction with each other, the mouse 14 being used to vary the position, that is, describing the position and direction of the shape by moving the mouse 14 on its pad 13, and simultaneously varying the width by using various keys on the keypad 12 to either increase or decrease the width at a given point. Alternatively, the user could hold down a varying number of keys to represent a varying width at a given point. Another possible alternative method for the user to specify a variable width shape would be to move stylus 17 within the fluid 19 wherein the current position of the line is represented by the user moving the stylus 17 through the fluid 19 within the reservoir 18. Simultaneously, the user may vary the width of the line at any point by changing the depth of the stylus 17 within the fluid 19 causing the level of the fluid 19 to correspondingly change which is sensed by a sensing device within the reservoir 18.

In yet another alternative embodiment, the reservoir 18 containing the fluid 19 (or a pressurized gas) could be attached to the end of the stylus 17 in such a manner that the whole combination could be moved along any surface with the pressure exerted by the user on the stylus 17 measured by the displacement of the fluid 19 by the end of the stylus 17, or by the force from the stylus 17 exerted on a pressurized gas within the reservoir.

Figure 2:
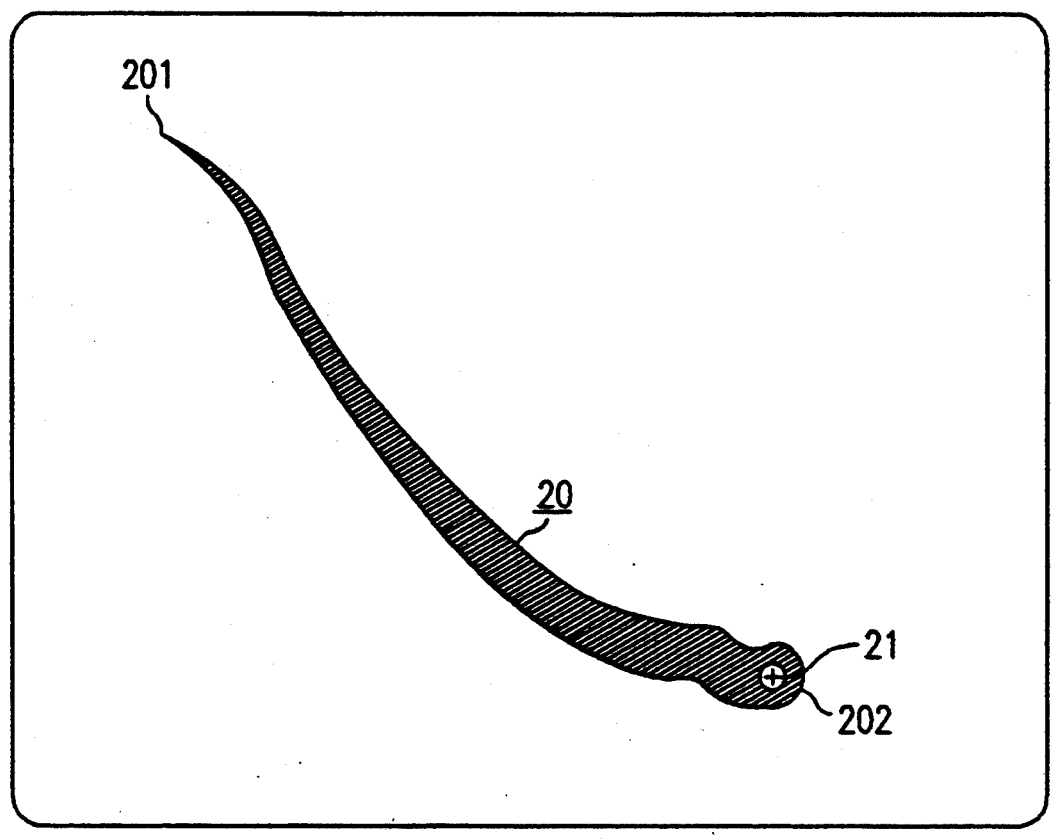
FIG. 2 shows a variable width line created on a monitor screen.

FIG. 2 depicts an example of a user-created variable width shape 20 beginning from point 201 and ending at point 202. Cursor 21 is the point used to describe the current position and width of the shape.

It will be recalled that this shape is created by the user moving a stylus 16 for example from point 201 to 202 and increasing the pressure on the stylus 16 as it is moving across the pad 15. The increasing pressure on the stylus 16 produces an increasingly wider shape as depicted in the present example. Also, as previously discussed, this could have been accomplished with a mouse 14 and a keypad 12, a stylus 17 and a fluid-filled reservoir 18 or any other number of ways of inputting data. Of course, shape 20 could be varied in dimensions such that it becomes wider or thinner as the line progresses; this shape has not been shown, but any number of widths and changes in widths can be accomplished using this system. Therefore, there can be an infinite number of shapes and widths utilizing the system of the present invention. In the embodiment shown line 20 is essentially a straight line, but it could certainly be a curved line or a circle or any other of an infinite number of shapes and sizes.

Figure 3:
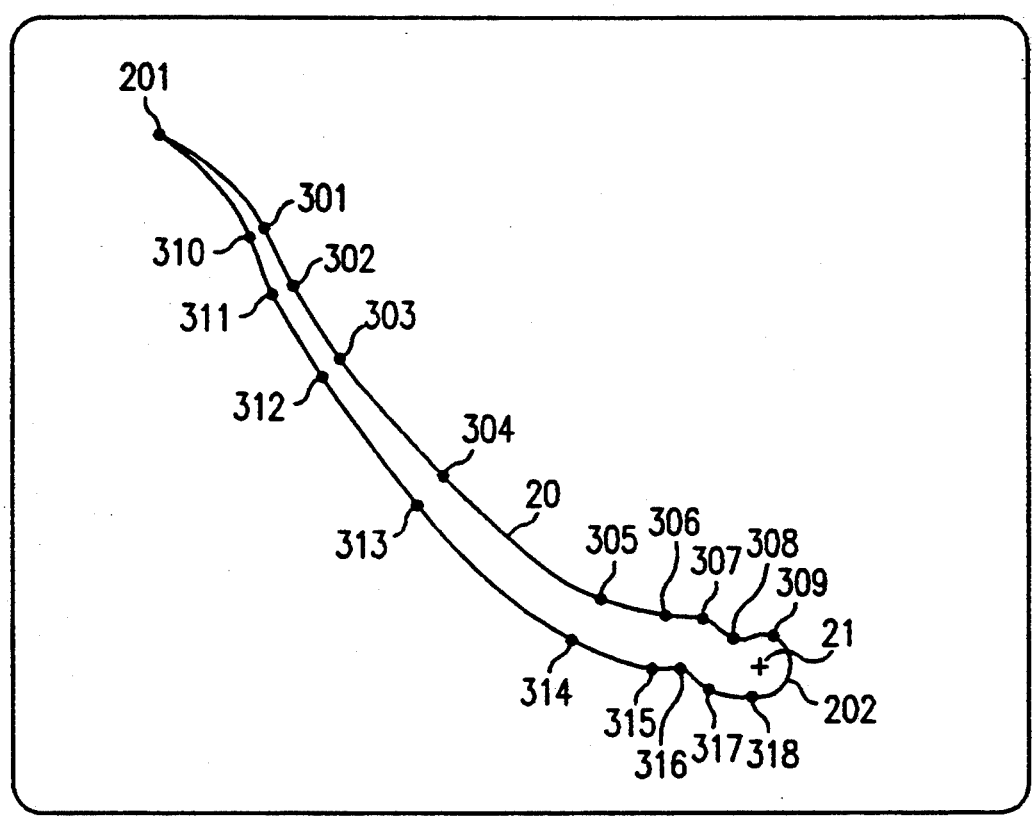
FIG. 3 shows the outline form of the variable width line.

The illustration in FIG. 3 shows the results of the actual curve expansion after the user has finished specifying the shape that he wants. Shape 20 is still depicted here with beginning point 201 and ending point 202. However, rather than described as simply a shape 20, it is now described as the boundary outline of the shape 20 that was described in FIG. 2. Utilizing the system of the present invention, a user can determine which part of shape 20 requires editing. Points have been added along the shape 20 at the change points of the shape 20, where the boundary outline of the shape 20 changes direction significantly, so that the user can alter the shape 20 in the manner to be discussed. Therefore, it is important to note that the points that are added such as point 304 are added by the system at strategic points along the line such that the user can thereafter modify the line and create a new line in any economical fashion. It should also be noted that so long as pressure remains on the stylus 16 or so long as the line is continuing to be created, the entire form of the line is visible on the screen. When the user lets up or stops creating the line, the form is substituted for by the outline points. It is at this point that the points are added to the line for purposes of editing.

Figure 4:
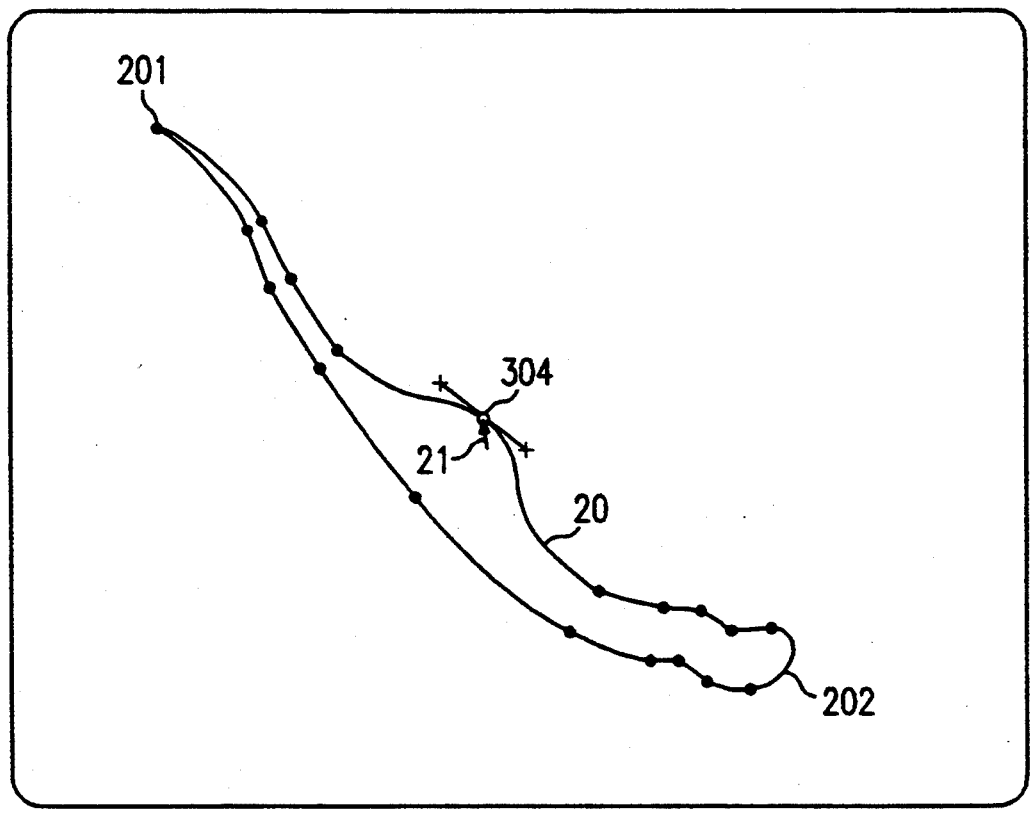
FIG. 4 shows the expansion of the variable width line at a point.

FIG. 4 shows the same form depicted in FIGS. 2 and 3 after the user has made a slight modification to the outline. This FIG. 4 is used to demonstrate that the boundary outline created by this technique is fully modifiable and easy to reshape in any manner that the user desires. For example, the cursor 21 which was used to create the line in shape 20 in FIG. 2 upon release from the creation line is then moved to, for example, point 304 along the shape 20 and captures point 304 in any one of the well known techniques and drags point 304 to a new point on the screen, thereby creating a different thickness of shape 20 in the center of line 201–202 as shown in FIG. 4. Of course, the cursor 21 could then be moved to any other point along the outline of shape 20 and similarly move that point in any direction, again changing the thickness of the shape 20 at the newly selected point.

Figure 5:
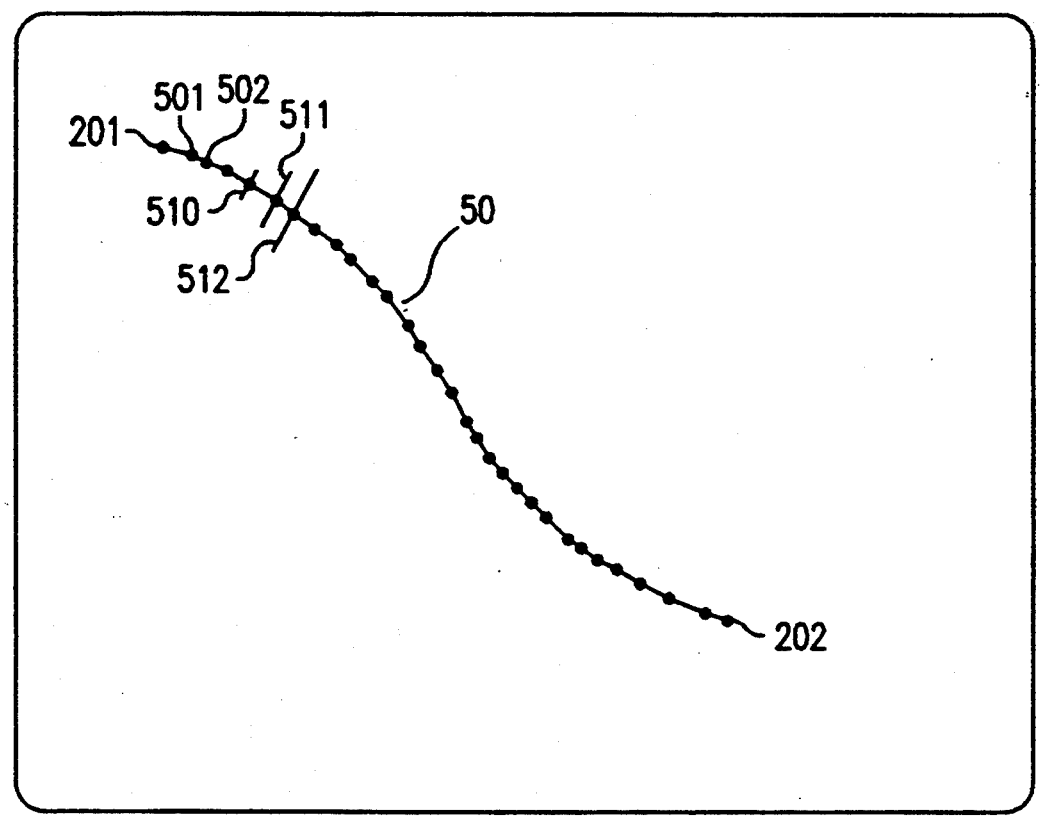
FIG. 5 shows the center line or spine of the variable width line.

Referring next to FIG. 5 there is shown a representation of an internal structure used within the system to contain temporary information while the user is first constructing the shape 20 depicted in FIG. 2. Basically, 50 is the center line or spine and set of widths that are later used to construct shape 20. Object 50 is composed of two discrete sets of data, locations and widths. Locations are such as 501, 502, etc. Every location has associated with it a width 510, 511, 512, etc. A new sample is taken along the object 50 anytime the user specifies a change in location or width by moving the stylus 16 over the tablet 15 or by changing the pressure of the stylus 16 upon the tablet 15. The end result is a center line or spine used to describe the center of the desired shape 20 and a width at each point along that spine indicating the desired final width at that point.

Figure 6:
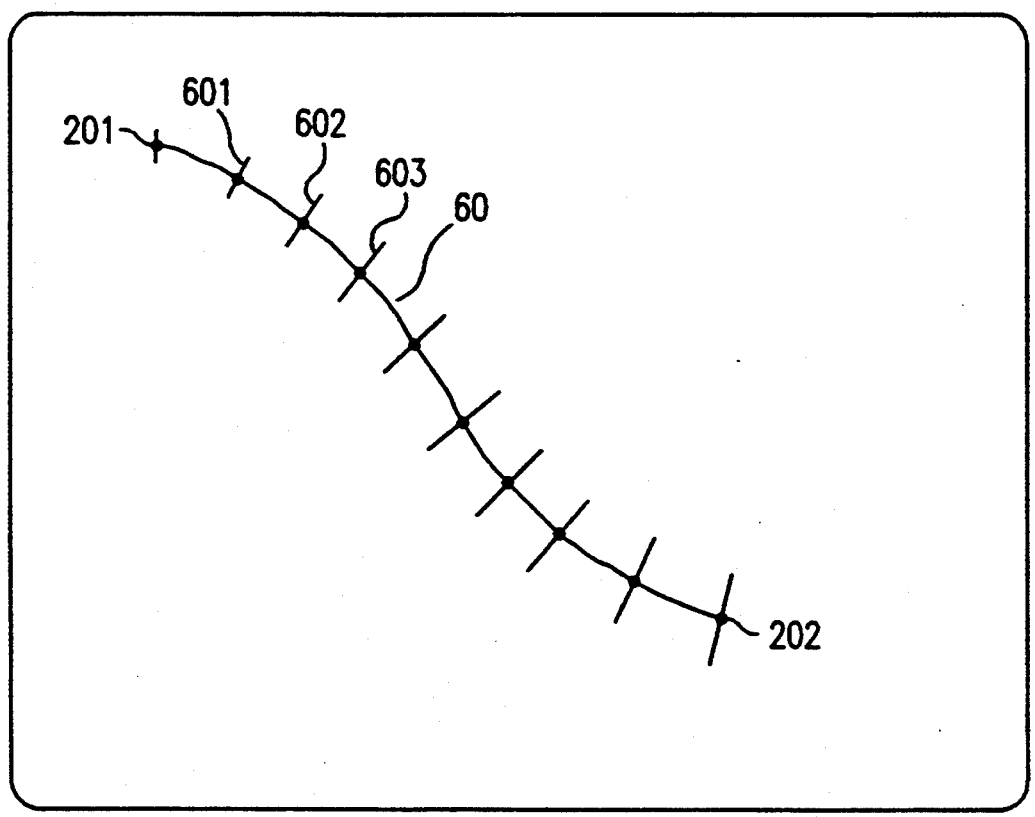
FIG. 6 shows the center line or spine with various points and corresponding width information after filtering.

FIG. 6 shows the information in object. 50 of FIG. 5 after a filtering process. The result is a filtering of the very large number of samples taken for each minute change the user specified into a small number of points to describe the center line of the desired shape 60. Each remaining point still contains a desired width. The number of samples has been filtered to the minimum number of points that can be used to most closely approximate the curve that the user has drawn. The actual choice of the placement and number of points on shape 60 is dependent not only upon the complexity of the curve but also on the variability of the widths. Normally, if the shape 60 was purely a straight line, it could be described with only two points. However, if the width varied considerably, more points would have to be inserted in order to describe the changes in widths. Thus, the required number of points does depend on two factors, both the accuracy with which the curve can be described and the accuracy with which the variability of width can be described without losing an unacceptable number of changes in the widths as inputted by the user. This system for describing a number of points will be detailed hereinafter with respect to FIG. 8.

Figure 7:
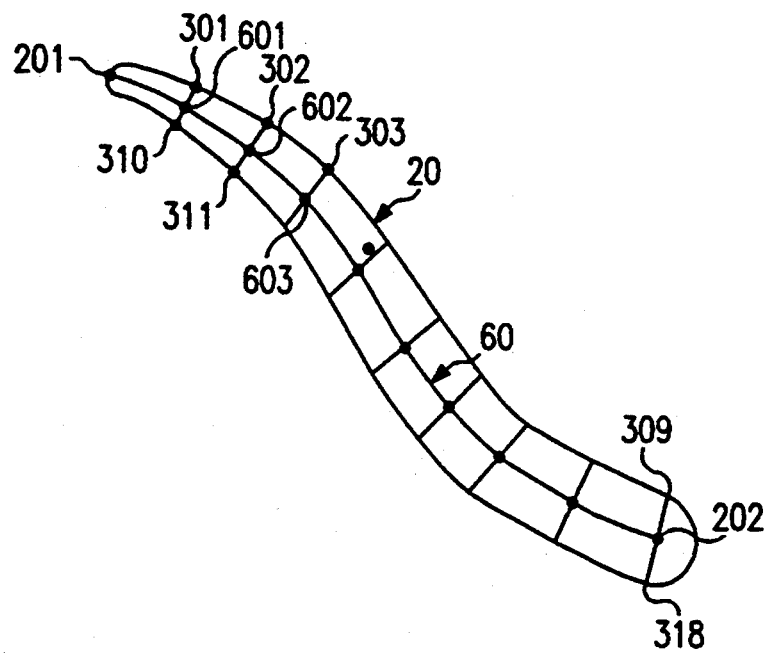
FIG. 7 shows the outline form of the variable width line in FIG. 6.

In FIG. 7 there is superimposed shape 20 from FIG. 3 and shape 60 from FIG. 6 to show how shape 20 is actually derived from shape 60. Shape 60 describes the spine or center line of the desired form with a represented width at every point. A technique well known in the art is used to expand shape 60 into shape 20, that is, every point and width on shape 60 is going to be expanded out to become two points on the boundary for shape 20. The technique for doing so is a prior art technique known as centerline figure expansion which is available from Texas Instrument's CAD systems dating back to the late 1960's.

Figure 8:
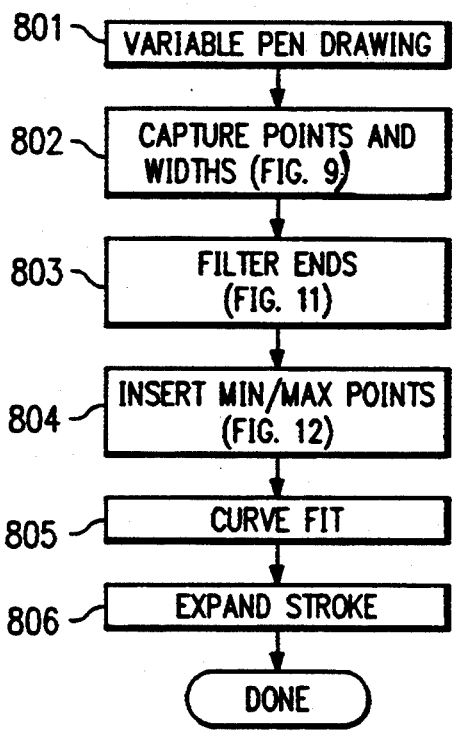
FIG. 8 is a flowchart of the variable-weight pen drawing process.

The flowchart of FIG. 8 illustrates how the system of the present invention implements variable-weight pen drawing.

The procedure begins at 801 and at 802 the points lying on the midpoint or spine of the variable-width stroke are captured from the drawing tablet along with the pressure at each of those points. Simple input filtering is also performed at this time. This is explained in more detail in FIG. 9.

Next at 803, filtering of the ends of the shape is required to remove random jitter at the end of the stroke. This process is explained in more detail in FIG. 11.

The variable-width drawing process moves to 804 where points with minimum and maximum width are marked for the curve fitter so that they are forced to be fit and cannot be removed during curve fitting. This is required to maintain width accuracy. This is further explained in FIG. 12.

At 805, the process of curve fitting reduces the large number of x-y points obtained by tracking an input device like a mouse or data tablet, or by contour-following a scanned image, to a much smaller number (typically 1% or less of the original point count) of line or curve segments that closely approximate the original data. Algorithms to do this with line segments or certain classes of curve segments are well known in the literature. In particular, a prior art algorithm to do interactive curve fitting for piecewise Bezier curves was first publicly demonstrated at the introduction of Aldus ® FreeHand ™ 1.0, in November 1987 (the program drew its name from this innovative capability of curve fitting freehand drawings). This algorithm calculates the average incoming and outgoing slope at each original input point, picks points of high curvature variation as important corner points, and fits the other original points as closely as possible using Bezier curves or straight lines between the identified corner points. The algorithm is modified in the following ways for variable width fitting: 1) During curve fitting the prior art algorithm had removed original input points unneeded for accurate fitting; the modified version does not remove minimum and maximum width points flagged in step 803. This preserves width variations along curves. 2) During clean-up after initial fitting, the prior art algorithm had removed colinear curve-fitted points (i.e. a point lying on a straight line connecting its previous and next curve-fit point neighbors); the modified version does not remove these colinear points if their width is significantly (5-10%) different from the adjacent points. This preserves width variations in straight lines. 3) During clean-up, the prior art algorithm had averaged nearby corner points together to reduce them to one point. The modified version also averages their widths if they are close to the same width, or maintains them as separate points if not.

Thereafter, at 806, during expansion, the expanded curve is offset from the spine by ½ the expansion width on each side of the spine, in a direction perpendicular to the slope of the curve at that point. Each curve-fit point along the spine of the variable-width line has an associated width collected at data input time, and possibly filtered during curve fitting. This works similarly to prior art first shown in Fontographer 3.0 in August 1990, but with a modification to allow a different width at each point being expanded. The end points of the expanded curve are fixed up as requested (with either blunt or round caps), and self-overlap is removed if it was inserted during expansion. This expansion process is not fully documented here, being prior art.

The important aspect of the present invention is that without the previously described curve fitting, or a process equivalent to such curve fitting, it is not possible to know the actual slope at each expansion point on the spine, and thus it is not possible to accurately know how to expand the curve in a direction perpendicular to the slope of the curve. Determining the true slope at a point requires knowing both the incoming slope and the outgoing slope. If this expansion was attempted during initial point capture, the outgoing slope of each point would not yet be known, so the expansion would not be accurately computable.

Two alternative methods of performing the entire variable-stroke pen drawing process are: 1) to use the graphical feedback provided during the initial drawing as a bitmap which could be curve fit by tracing its outer perimeter, or 2) to capture the spine and width, possibly performing simple filtering on the points and their widths, then draw the result into a temporary bitmap and curve fit to that bitmap. While initially considering both possibilities, the current invention improves upon them by allowing for curve fit and expansion as two separate steps. Thus, it is possible to maintain the original spine points together with width information at each of those points, and perform the expansion at a later time, possibly after editing either the coordinates of the points on the spine, their widths, or inserting or deleting other points and widths.

Figure 9:
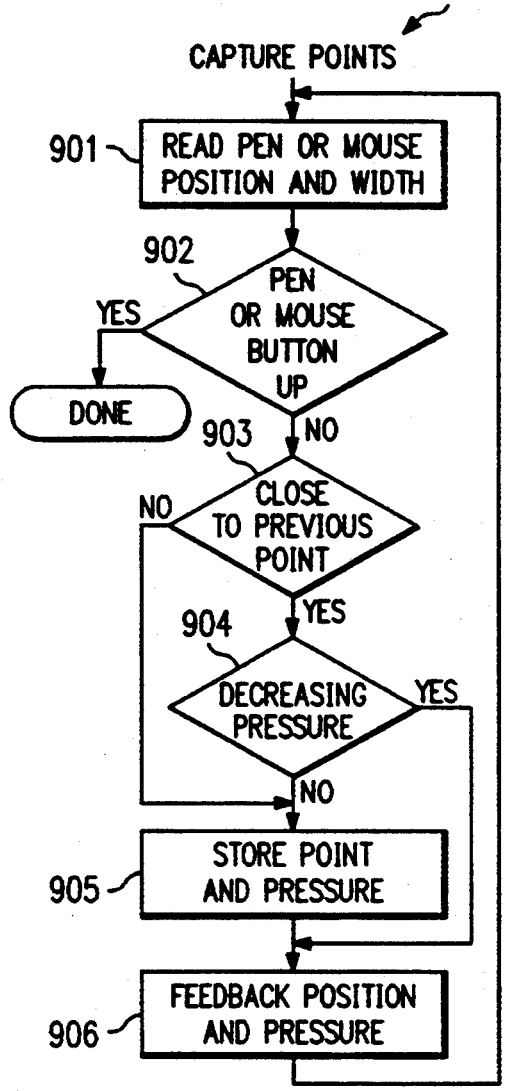
FIG. 9 is a flowchart detailing the process for capturing points and widths.

Referring now to FIG. 9, there is shown the flowchart detailing the capturing of points and widths 802 as previously shown in FIG. 8. This includes some simple filtering for handling the endpoint of the stroke. On a pressure sensitive data tablet, the pressure necessarily goes to zero at the end of each stroke as the stylus is lifted from the tablet surface, although this zero width is not desired if the stroke had high pressure just before the pen lift. Also during the lift up, it is very likely that the pen position will jitter slightly, giving inaccurate positional information which would distort the end of the stroke if not compensated for. This capture process eliminates most such problems, and the final filtering in detail drawing 802 completes the filtering process.

Initially at 901, the points lying on the midpoint or spine of the variable-width stroke are captured from the drawing tablet or other input device (such as a mouse) along with the pressure at each of those points, and stored in a memory array for later processing. This pressure can be interpreted as the width of the round or oval stroke at that point, as it is treated herein, or in a variety of other ways, such as intensity of color, color gradation, or pen angle and/or width for a calligraphic pen stroke. If the input device is not capable of reporting pressure, it can be simulated by pressing a variable number of keys on the keyboard during point input (more keys for more pressure), or by pressing one key to increase pressure and another key to decrease pressure. If pen angle is reported by the input device, this also can be stored in a similar fashion for directly controlling the angle of a calligraphic pen, or controlling another dimension of variation (for example the pressure could control the width of a stroke and the angle could control its shading or horizontal/vertical aspect ratio).

Next at 902, the process asks whether the pen is lifted up from the pad, or the mouse button is released. If yes, the capturing of the information is completed and the system proceeds to analyze it (see 803 in FIG. 8).

If the pen or mouse button is not up, the process proceeds to 903 where it decides if the location of the current point is relatively distant from the previous point (e.g., farther than 3 to 4 units). If it is distant, it is then stored in the point capture array 905.

If the current point is close to the previous point, then the process determines at 904 whether or not the pressure from the pen, for example, is decreasing. If yes, this new point is not stored. If this is part of the final pen lift, this step prevents spurious data from being stored. If this occurs during the middle of a stroke, the moving pen position will soon be farther away from the last stored point location, and that new point will be stored.

If the pressure is not decreasing, then at 905 the new point and its pressure (and angle, if that is captured) are stored in an array of points for later processing. The point array is expanded as necessary to hold as many points as are captured.

Figure 10:
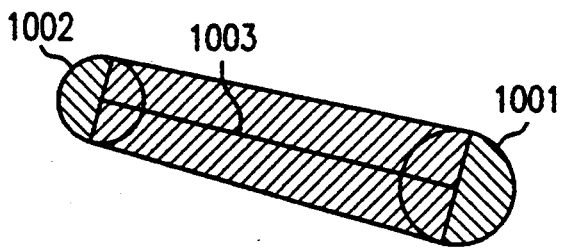
FIG. 10 shows the filling-in of the end-points of the variable width line.

Next at 906, graphical feedback is given to the user. For a variable weight round or oval pen, a circle or oval is drawn at this new point and at the previous point, and a four-sided polygon is drawn to fill in between the circles as shown in FIG. 10. The circles 1001, 1002 are drawn with a radius corresponding to the stroke width at each point, and the polygon is drawn perpendicular to the line 1003 connecting the new point and the previous point, projecting out a distance equal to ½ the width at the corresponding point. Frequently this polygon is unnecessary, due to the points being very close together, but during fast drawing motions the point-to-point spacing may be large enough to leave gaps without this polygon.

The process then returns to 901 to repeat the steps for the next point drawn.

Figure 11:
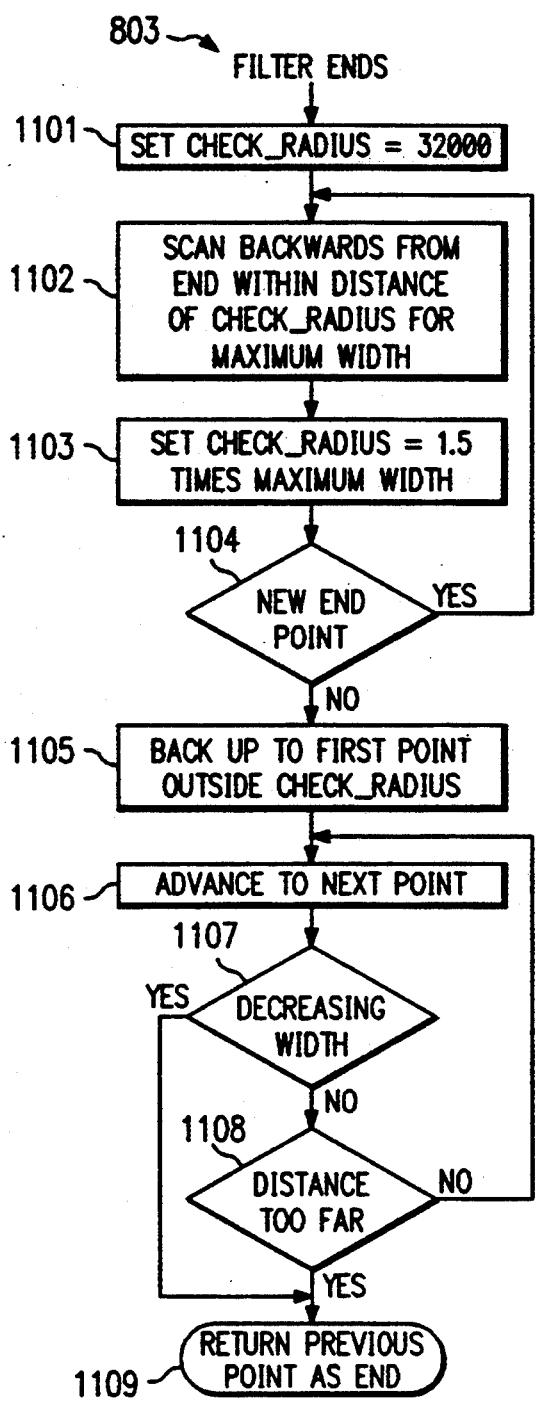
FIG. 11 is a flowchart detailing end-point filtering.

Referring next to FIG. 11 there is illustrated a flowchart for end-point filtering (see 803, FIG. 8). This process cleans up final hooks and jags caused by lifting up on the pen at the end of a stroke. It is very easy to wiggle the pen a bit at the end of a stroke, and if unfiltered, this wiggle would be curve fit, causing a nasty jag at best, or a self-intersecting figure at worst. This filtering attempts to determine the true end point, before the pen has lifted.

Beginning at 1101, the variable check__radius is set to a large number, for example 32000. This is the radius within which widths are checked. The variable match___point is also set to −1.

Next at 1102, the system scans backwards from the end point within a circle of radius check__radius, which is the circular radius within which points must lie to be checked by the algorithm, finds the maximum width point and notes its point number in variable new__max, which is the point number of the maximum-width point found so far in the width scanning process.

Thereafter at 1103, the system sets the check__radius to 1.5 times the maximum width found in step 1102.

At 1104, the system asks if the variable new__max found in 1102 is different than the previous point of maximum width called match__point, which is the point number of the previously matched point. If yes, it sets match__point to the value of new__max and continues the loop another time at 1102. The radius checked is decreasing as the end becomes closer, which means the true desired radius is getting closer.

If the variable new max is not different from the previous point of maximum width, the system proceeds to 1105 and works backwards from the end point to the first point outside a circle of radius check__radius centered on that end point. This point number is saved in match__point and is the last known good point before the pen lift. The new__max is set to this point also.

At 1106 the new__max is set to its previous value plus one.

Then at 1107, the system asks whether the width at point new__max is less than the width at point match___point. If yes, lift up of the pen has started and the previous value of new__max should return as the number of the end point.

If the width is not decreasing, the system proceeds to 1108 and asks whether the distance from new__max to match__point is less than the previous distance from new__max to match__point. If yes, the furthest point of a jag that doubles back on itself has just passed and should be thrown away. The end point becomes the previous value of new__max. If the distance is not too far, the system returns to 1106 to advance to the next point.

Figure 12:
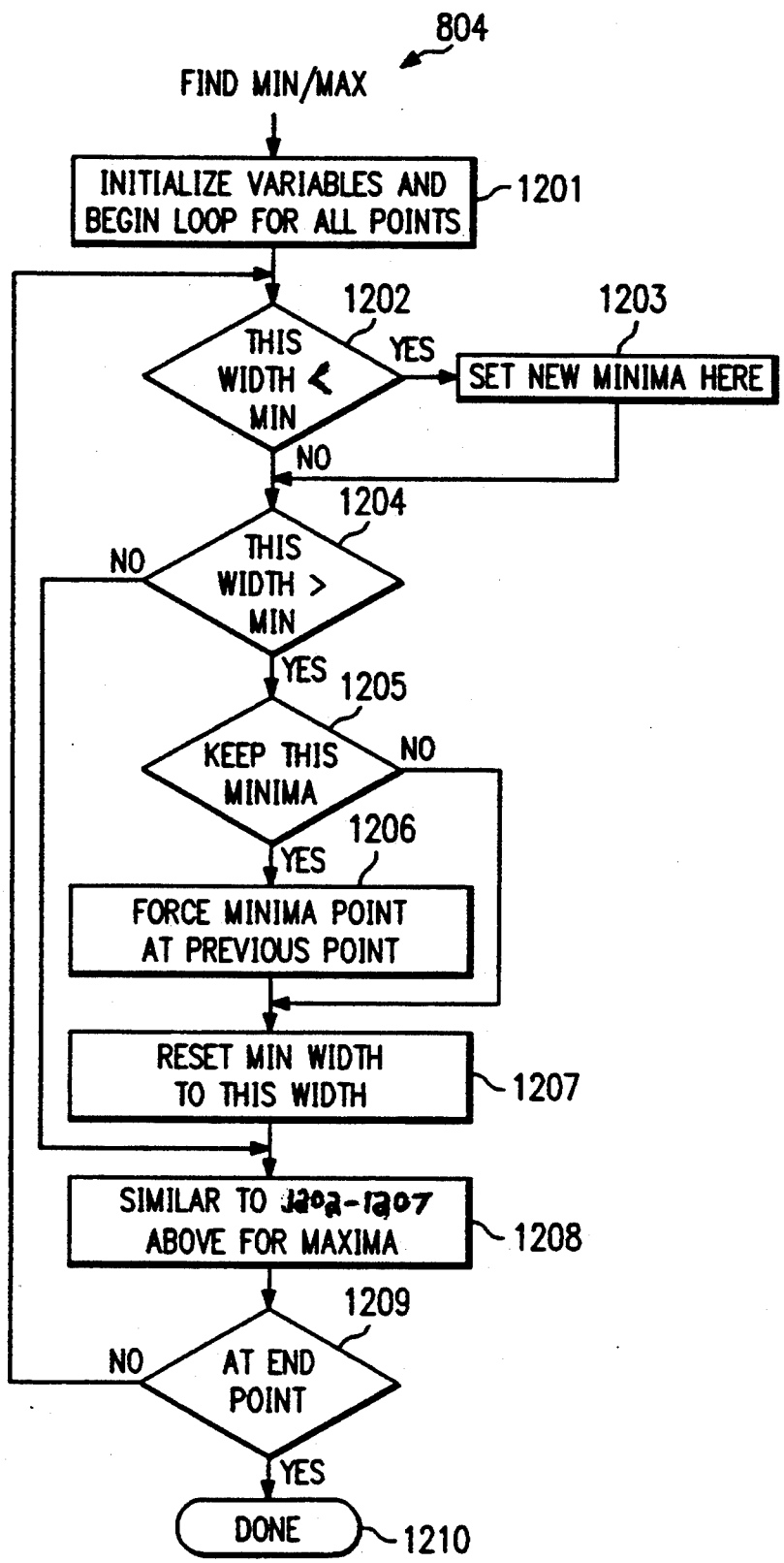
FIG. 12 is a flowchart for finding the minimum and maximum width values to be utilized within the curve fitter.

Now referring to FIG. 12, there is shown a flow chart detailing the process for minimum/maximum width finding. This process picks out minimum and maximum width values (min__width and max__width) that should be retained by the curve fitter. It is insensitive to minor width variations which can be caused by jitter from the input device. It is likely that the input pressure, being an analog measurement digitized to fairly low accuracy, will vary slightly during a stroke. Such variations need to be filtered out or they will force an inordinate number of points to be generated by the curve fitter. However, if the variation is significant, it should be retained so the user can create a line that varies from thick to thin and back again which the curve fitter will properly fit.

Beginning with 1201, the min__width and max__width are initialized to initial values of 32000 and −32000 and a loop is begun for all points of the path. Next, at 1202, the system asks whether the width at this point is less than minimum. If yes, then at 1203 a new minimum is set at this point. If the width at this point is not less than the minimum, then at 1204 the system asks if the width at this point is greater than minimum, thus surpassing the minimum width point. If the width at the present point is equal to that of the previous point, then the system moves to 1208 to find the maximum width point. If the width is greater than minimum, then at 1205 the system will inquire whether the previous point is far enough away from the previous minima point (the exact distance being a parameter to this function), and if its width is sufficiently different from the last point.

If yes, then at 1206 the previous point is marked as a minima point.

The system proceeds to 1207 to reset the minimum width to this point's width.

Next at 1208 the system conducts a similar process and procedure as that of 1202-1207, except the procedural steps replace minimum with maximum, and replace greater-than with less-than, and less-than with greater-than. This process finds the maximum widths analogously to the process detailed above for minimum widths.

At 1209 the system asks if the end point of the variable width form has been reached. If no, the procedure is continued at 1202 for all points of the path. If the end point has been reached, the system ends at 1210. Although the present invention and its advantages have been described in detail, it should be understood that various changes, substitutions and alterations can be made herein without departing from the spirit and scope of the invention as defined by the appended claims.

What is claimed is:

1. A method of constructing a graphic representation of a line where the line has variable controlled widths along any segment thereof, said method comprising the steps of:

accepting input from a user, said input including data pertaining to a direction of the line and to its width at any point along said line;

constructing from said input data an outline image and mathematical representation of a boundary of said line, said outline representative of a composite of said line direction and width and said outline containing points spaced therealong, said points editable for modifying said outline image subsequent to said construction of said outline;

moving any selected ones of said outline points; and creating a revised outline of said desired image incorporating all of said moved outline points.

2. The method set forth in claim 1 wherein said input is accepted from an object moving across a surface to define said desired line direction.

3. The method set forth in claim 2 wherein said width information is accepted from pressure data generated between said object and said surface during the course of movement of said object.

4. The method set forth in claim 3 wherein said object is a stylus having a point of contact with said surface.

5. The method set forth in claim 4 wherein said stylus cooperates with said surface to provide data representative of the pressure of said stylus point of contact with said surface.

6. The method set forth in claim 2 wherein said object is a mouse.

7. The method set forth in claim 1 further including the step of:
displaying an image of the filled in shape of said outline.

8. A method of constructing a graphic representation of a line where the line has variable controlled widths along any segment thereof, said method comprising the steps of:
accepting input from a user, said input including data pertaining to a direction of the line and to its width at any point along said line; and
constructing from said input data an outline image and mathematical representation of a boundary of said line, said outline representative of a composite of said line direction and width and said outline containing points spaced therealong, said points editable for modifying said outline image subsequent to said construction of said outline, by establishing on a non-imaging basis a center line of said graphic representation of said line, said center line including initial points established at various positions along said line, each said initial point having associated therewith vector data pertaining to a desired width of said image at each said associated initial point.

9. A method of constructing a graphic representation of a line where the line has variable controlled widths along any segment thereof, said method comprising the steps of:
accepting input from a user, said input including data pertaining to a direction of the line and to its width at any point along said line; and
constructing from said input data an outline image and mathematical representation of a boundary of said line, said outline representative of a composite of said line direction and width and said outline containing points spaced therealong, said points editable for modifying said outline image subsequent to said construction of said outline, wherein said input is accepted from an object moving across a surface to define said desired line direction and wherein said width information is accepted from a source external to said object.

10. The method set forth in claim 9 wherein said external source is a key pad.

11. A method of constructing a graphic representation of a line where the line has variable controlled widths along any segment thereof, said method comprising the steps of:
accepting input from a user, said input including data pertaining to a direction of the line and to its width at any point along said line;
constructing from said input data an outline image and mathematical representation of a boundary of said line, said outline representative of a composite of said line direction and width and said outline containing points spaced therealong, said points editable for modifying said outline image subsequent to said construction of said outline; and
processing said accepted direction and width data to create at least one end point of said line image based upon direction and width data pertaining to adjacent image line segments.

12. A method of constructing a graphic representation of a line where the line has variable controlled widths along any segment thereof, said method comprising the steps of:
accepting input from a user, said input including data pertaining to a direction of the line and to its width at any point along said line;
displaying a replica image corresponding to the direction and width of a desired image as obtained from said accepted data, said replica image being displayed concurrently with the acceptance of said direction and width data; and
constructing from said input data an outline image and mathematical representation of a boundary of said line, said outline representative of a composite of said line direction and width and said outline containing points spaced therealong, said points editable for modifying said outline image subsequent to said construction of said outline.

13. A system for establishing a data file of positional curve control points, said data file created from a series of inputted data points, said inputted data points representative of a line including said line's direction and width at any point therealong, said system comprising:
means for processing said data points into a replica image as obtained from said inputted data points; and
means operative at an end of said inputted data points for creating said data file of curve control points as an outline of said replica image, said curve control points editable for modifying said outline subsequent to said creation of said file; and
means for creating a set data points representative of a center line of said replica outline, each said center line data point including data point vectors pertaining to the width of said replica image at said point.

14. The system set forth in claim 13 further including:
means operable while said outline image is displayed for rearranging any of said curve control points; and
means for displaying a new replica image corresponding to said rearranged curve control points.

15. The system set forth in claim 13 further including a video screen for displaying said images.

16. The system set forth in claim 13 further including a printer for displaying said images.

17. The system set forth in claim 13 further comprising:
means for generating said line direction data points; and
means for generating said line width data points.

18. The system set forth in claim 17 wherein said line direction data point generating means includes an object moving across a medium.

19. The system set forth in claim 18 wherein said medium is hard and wherein said line width data point generating means includes means for determining the pressure of said object with respect to said medium.

20. The system set forth in claim 18 wherein said medium is in a fluid form and wherein said line width data point generating means includes means for determining the depth of immersion of said object with respect to said medium.

21. A system for establishing a data file of positional curve control points, said data file created from a series of inputted data points, said inputted data points representative of a line including said line's direction and width at any point therealong, said system comprising:
    means for processing said data points into a replica image as obtained from said inputted data points; and
    means operative at an end of said inputted data points for creating said data file of curve control points as an outline of said replica image, said curve control points editable for modifying said outline subsequent to said creation of said data file;
    means for controllably displaying said replica image; and
    means for displaying said outline image in substitution for said replica image.

22. A system for establishing a data file of positional curve control points, said data file created from a series of inputted data points, said inputted data points representative of a line including said line's direction and width at any point therealong, said system comprising:
    means for processing said data points into a replica image as obtained from said inputted data points;
    means operative at an end of said inputted data points for creating said data file of curve control points as an outline of said replica image, said curve control points editable for modifying said outline subsequent to said creation of said data file; and
    means for generating said line direction data points; and means for generating said line width data points wherein said line width data point generating means includes a signal source external from said object.

23. The system set forth in claim 22 wherein said external signal source is a key pad.

24. A system for establishing a data file of positional curve control points, said data file created from a series of inputted data points, said inputted data points representative of a line including said line's direction and width at any point therealong, said system comprising:
    means for processing said data points into a replica image as obtained from said inputted data points;
    means operative at an end of said inputted data points for creating said data file of curve control points as an outline of said replica image, said curve control points editable for modifying said outline subsequent to said creation of said data file; and
    means for modifying the width data at an end of said line in accordance with direction and width data of adjacently received line data.

25. An apparatus for generating variable width lines onto a medium, said apparatus comprising:
    an input device for inputting data corresponding to a desired line image, said data including direction and width information at various points along said line image;
    means for receiving said data;
    means controlled by said received data for creating said line image having a direction and width which varies along a length of said line in accordance with said direction and width information at said points along said line and wherein said line image is created so that it can be edited easily at any point to change the width; and
    means for editing said line image by modifying a boundary outline of said line image.

26. The apparatus of claim 25 wherein said medium is a video display.

27. The apparatus of claim 25 wherein said medium is a printer.

28. The apparatus of claim 25 wherein said input device is a pressure sensitive tablet with corresponding stylus.

29. The apparatus of claim 25 wherein said created line image is presented on said medium substantially simultaneously with said inputting of said direction and width data.

30. The apparatus of claim 29 wherein said line image is a solid representation having a boundary outline along its periphery.

31. The apparatus of claim 25 wherein the direction of said line image is varied by moving said stylus over said tablet and the width of said line image is varied at any point along said line image by altering the pressure from said stylus onto said tablet.

32. The apparatus of claim 25 further comprising means for filling in a boundary outline of said line image created from said direction and width data and displaying said filled in line image on said medium.

33. The apparatus of claim 25 wherein said input device is a mouse and associated keypad wherein the direction of said line image is varied by moving said mouse over a surface and the width of said line image is varied by using various keys on said keypad to either increase or decrease said width at any point along said line image.

34. The apparatus of claim 25 wherein said input device is a keyboard wherein various keys are used to determine the direction and width of said line image.

35. The apparatus of claim 25 wherein said input device is a stylus and attached reservoir containing a pressurized gas and sensors along the inside of said container for detecting the internal force of said pressurized gas wherein said reservoir is disposed at one end of said stylus so that when said stylus is moved along a surface to create a line image, said reservoir detects the pressure applied to said stylus by the movement of said stylus in and out of said pressurized gas causing said internal force of said pressurized gas to correspondingly change and be detected by said sensors.

36. The apparatus of claim 25 wherein said input device is a reservoir containing a pressurized gas, said reservoir including means along the inside of said reservoir for detecting the position of a stylus within said pressurized gas thereby establishing said width data.

37. The apparatus of claim 25 wherein said line image is displayed in real time.

38. The apparatus of claim 25 wherein said stylus is moved across said pressure sensitive tablet to create said line image and said table senses the pressure of said stylus at any point along said line image to create variable thickness lines.

39. An apparatus for generating variable width lines onto a medium, said apparatus comprising:
    an input device for inputting data corresponding to a desired line image, said data including direction and width information at various points along said line image;
    means for receiving said data;
    means controlled by said received data for creating said line image having a direction and width which varies along a length of said line in accordance with said direction and width information at said points along said line, wherein said created line image is presented on said medium substantially simultaneously with said inputting of said direction and width data and wherein said line image is a solid representation having a boundary outline along its periphery;

means for detecting the end of said inputting of said data;

means for editing said line image by modifying a boundary outline of said line image; and means controlled by said detecting means for substituting an outline form of said line image for said solid line image, said outline form having points along said periphery.

40. The apparatus of claim 39 further comprising means for moving any of said periphery points to other locations on said medium; and means for creating a new solid line image within the periphery created by the combination of the unmoved points and said moved points.

41. An apparatus for generating variable width lines onto a medium, said apparatus comprising:

an input device for inputting data corresponding to a desired line image, said data including direction and width information at various points along said line image, said input device having a stylus and attached reservoir containing a fluid and sensors along the inside of said container for detecting the depth of said fluid wherein said reservoir is disposed at one end of said stylus so that when said stylus is moved along a surface to create a line image, said reservoir detects the pressure applied to said stylus by the movement of said stylus in and out of said fluid causing the level of said fluid to correspondingly change and be detected by said sensors;

means for receiving said data;

means controlled by said received data for creating said line image having a direction and width which varies along a length of said line in accordance with said direction and width information at said points along said line; and means for editing said line image by modifying a boundary outline of said line image.

42. An apparatus for generating variable width lines onto a medium, said apparatus comprising:

an input device for inputting data corresponding to a desired line image, said data including direction and width information at various points along said line image, said input device having a reservoir containing a fluid, said reservoir including means along the inside of said reservoir for detecting the position of a stylus within said fluid thereby establishing said width data;

means for receiving said data;

means controlled by said received data for creating said line image having a direction and width which varies along a length of said line in accordance with said direction and width information at said points along said line; and means for editing said line image by modifying a boundary outline of said line image.

43. An apparatus for generating variable width lines onto a medium, said apparatus comprising:

an input device for inputting data corresponding to a desired line image, said data including direction and width information at various points along said line image;

means for receiving said data;

means controlled by said received data for creating said line image having a direction and width which varies along a length of said line in accordance with said direction and width information at said points along said line; and means for editing said line image by modifying a boundary outline of said line image wherein said modifying of said line image includes capturing a point along said boundary outline of said line image and moving said point as desired thereby creating a different boundary for said line image.

44. An apparatus for physically contacting a moving object to sense its dynamic movement and for displaying said movement of said moving object onto a medium, said apparatus comprising:

an input device which dynamically senses x, y and z coordinates of said moving object within a three-dimensional field, said sensing occurring by physical contact with said object;

means responsive to said input device for receiving data corresponding to said x, y and z coordinates of said object and displaying the movement of said object on said medium, wherein said data is displayed so that it can be edited easily at any point; and means for subsequently editing said displayed movement of said object.

45. The apparatus of claim 44 wherein said medium is a video display.

46. The apparatus of claim 44 wherein said medium is a printer.

47. An apparatus for generating variable width lines onto a medium, said apparatus comprising:

means for inputting a variable width line image with corresponding direction and width information at various points along said line image;

means for receiving data corresponding to said direction and width information of said line image;

means for creating said line image onto said medium said creating means responsive to said receiving means; and means for editing said line image by modifying a boundary outline of said line image wherein said editing means includes means for capturing a point along said boundary outline of said line image and moving said point as desired thereby creating a different boundary outline for said line image.

48. The apparatus of claim 47 wherein said medium is a video display.

49. The apparatus of claim 47 wherein said medium is a printer.

50. The apparatus of claim 47 further comprising means for filling in a boundary outline of said line image and displaying said filled-in line image on said medium.

51. The apparatus of claim 47 wherein said line image is displayed in real time.

52. A method for generating variable width lines in video graphic software, said method comprising the steps of:

inputting a variable width line image with corresponding direction and width information at various points along said line image;

processing and storing said direction and width data corresponding to said line image;

creating said line image onto a video display screen; and editing said line image to alter its shape; and editing any number of said points pertaining to such shape of said line to change the characteristics of said line.

53. The method of claim 52 further comprising the step of filling in the boundaries of said line image and displaying said filled-in line image on said video display.

54. The method of claim 52 wherein said inputting step includes moving a stylus across a pressure sensitive tablet wherein said movement of said stylus produces a number of points pertaining to the shape of a line and wherein the application of a variable pressure by said stylus onto said pressure sensitive tablet produces a variable width of said line image at the various points along said line.

55. The method of claim 52 wherein said inputting step includes moving a mouse over a surface to trace a set of points producing a line and wherein an associated keypad is manipulated to produce a variable width of said line image at various said set of points along said line.

56. The method of claim 52 wherein said inputting step includes the manipulation of various keys on a keyboard to produce a set of points producing a line and manipulating keys on said keyboard to vary the width at various said set of points of said line.

57. The method of claim 52 wherein said inputting step includes moving a stylus with an attached reservoir at one end of said stylus across a surface to trace a set of points producing a line and wherein said reservoir contains a fluid and sensors along the inside of said container for detecting the depth of said fluid and wherein said stylus is moved in and out of said reservoir producing various levels of said fluid which are detected by said sensors wherein the fluctuating level of said fluid produces a correspondingly fluctuating width of said line.

58. The method of claim 52 wherein said inputting step includes moving a stylus with an attached reservoir at one end of said stylus across a surface to trace a set of points producing a line and wherein said reservoir contains a pressurized gas and sensors along the inside of said container for detecting the internal force of said pressurized gas and wherein said stylus is moved in and out of said reservoir producing various forces of said pressurized gas which are detected by said sensors wherein the fluctuating force of said pressurized gas produces a correspondingly fluctuating width of said line.

59. The apparatus of claim 25 wherein said input device utilizes the force exerted on a surface to control the width of said line image simultaneously as said line image is being generated.

60. An apparatus for generating variable width lines onto a medium, said apparatus comprising:
an input device for inputting data corresponding to a desired line image, said data including direction and width information at various points along said line image;
means for receiving said data;
means controlled by said received data for creating said line image having a direction and width which varies along a length of said line in accordance with said direction and width information at said points along said line;
means for editing said line image by modifying a boundary outline of said line image; and
means for editing said line image at any point along said line image to change the width.

61. An apparatus for generating variable width lines onto a medium, said apparatus comprising:
an input device for inputting data corresponding to a desired line image, said data including position and width information at various points along said line image;
means for receiving said data;
means controlled by said received data for creating said line image having a position and width which varies along a length of said line in accordance with said position and width information at said points along said line, wherein said line image is a solid representation having a boundary outline along its periphery;
means for detecting the end of said inputting of said data;
means controlled by said detecting means for substituting an outline form of said line image for said solid line image, said outline form having points along said periphery; and
means for editing said line image by modifying said boundary outline of said line image.

62. The apparatus of claim 61 wherein said medium is a video display.

63. The apparatus of claim 61 wherein said medium is a printer.

64. The apparatus of claim 61 wherein said input device is a pressure sensitive tablet with corresponding stylus.

65. The apparatus of claim 61 wherein said created line image is presented on said medium substantially simultaneously with said inputting of said position and width data.

66. The apparatus of claim 61 further comprising
means for moving any of said periphery points to other locations on said medium; and
means for creating a new solid line image within the periphery created by the combination of the unmoved points and said moved points.

67. The apparatus of claim 61 wherein the position of said line image is varied by moving said stylus over said tablet and the width of said line image is varied at any point along said line image by altering the pressure from said stylus onto said tablet.

68. The apparatus of claim 61 wherein said input device is a mouse and associated keypad wherein the position of said line image is varied by moving said mouse over a surface and the width of said line image is varied by using various keys on said keypad to either increase or decrease said width at any point along said line image.

69. The apparatus of claim 61 wherein said input device is a keyboard wherein various keys are used to determine the position and width of said line image.

70. The apparatus of claim 61 wherein said input device is a stylus and attached reservoir containing a fluid and sensors along the inside of said container for detecting the depth of said fluid wherein said reservoir is disposed at one end of said stylus so that when said stylus is moved along a surface to create a line image, said reservoir detects the pressure applied to said stylus by the movement of said stylus in and out of said fluid causing the level of said fluid to correspondingly change and be detected by said sensors.

71. The apparatus of claim 61 wherein said input device is a stylus and attached reservoir containing a pressurized gas and sensors along the inside of said container for detecting the internal force of said pressurized gas wherein said reservoir is disposed at one end of said stylus so that when said stylus is moved along a surface to create a line image, said reservoir detects the pressure applied to said stylus by the movement of said stylus in and out of said pressurized gas causing said internal force of said pressurized gas to correspondingly change and be detected by said sensors.

72. The apparatus of claim 61 wherein said input device is a reservoir containing a fluid, said reservoir including means along the inside of said reservoir for detecting the position of a stylus within said fluid thereby establishing said width data.

73. The apparatus of claim 61 wherein said input device is a reservoir containing a pressurized gas, said reservoir including means along the inside of said reservoir for detecting the position of a stylus within said pressurized gas thereby establishing said width data.

74. The apparatus of claim 61 further comprising means for filling in the boundary outline of said line image created from said position and width data and displaying said filled in line image on said medium.

75. The apparatus of claim 61 wherein said modifying of said line image includes capturing a point along said boundary outline of said line image and moving said point as desired thereby creating a different boundary for said line image.

76. The apparatus of claim 61 wherein said line image is displayed in real time.

77. A system for generating a font where various segments of the font have variable width lines, said system comprising:
means for accepting input from a user, said input including data pertaining a direction and position of a font line and to its width at any point along said font line; and
means for constructing from said input data an outline image of said font line, said outline representative of a composite of said direction, position and width of said font line and said font outline containing points spaced therealong, said points editable for modifying said font outline subsequent to said construction of said font outline;
means for moving any selected ones of said outline points; and
means for creating a revised outline of said font line incorporating all of said moved outline points.

78. The system for generating a font as set forth in claim 77 wherein said input is accepted from an object moving across a surface to define said desired line direction.

79. The system for generating a font as set forth in claim 78 wherein said width information is accepted from pressure data generated between said object and said surface during the course of movement of said object.

80. The system for generating a font as set forth in claim 79 wherein said object is a stylus having a point of contact with said surface.

81. The system for generating a font as set forth in claim 80 wherein said stylus cooperates with said surface to provide data representative of the pressure of said stylus point of contact with the said surface.

82. The system for generating a font as set forth in claim 78 wherein said object is a mouse.

83. The system for generating a font as set forth in claim 77 wherein said accepting means and said constructing means are included within a computer system wherein said font is generated within said computer system for display by an output means.

84. The system for generating a font as set forth in claim 83 wherein said output means is a video terminal.

85. The system for generating a font as set forth in claim 83 wherein said output means is a printer.

86. A system for generating a font where various segments of the font have variable width lines, said system comprising:
means for accepting input from a user, said input including data pertaining a direction and position of a font line and to its width at any point along said font line, wherein said input is accepted from an object moving across a surface to define said desired line direction and wherein said width information is accepted from a source external to said object; and
means for constructing from said input data an outline image of said font line, said outline representative of a composite of said direction, position and width of said font line and said font outline containing points spaced therealong, said points editable for modifying said font outline subsequent to said construction of said font outline.

87. The system for generating a font as set forth in claim 86 wherein said external source is a keypad.

88. A system for generating a font where various segments of the font have variable width lines, said system comprising:
means for accepting input from a user, said input including data pertaining a direction and position of a font line and to its width at any point along said font line; and
means for constructing from said input data an outline image of said font line, said outline representative of a composite of said direction, position and width of said font line by establishing on a non-imaging basis a center line of said desired graphic representation of said font line, said center line including initial points established at various positions along said font line, each said initial point having associated therewith vector data pertaining to the desired width of said font at each said associated initial point, said points editable for modifying said font outline subsequent to said construction of said font outline.

89. An apparatus for generating variable width lines onto a medium, said apparatus comprising:
an input device for inputting data corresponding to a desired line image, said data including position and width information at various points along said line image;
means for receiving said data;
means controlled by said received data for creating said line image having a position and width which varies along a length of said line in accordance with said position and width information at said points along said line wherein said modifying of said line image includes capturing a point along said boundary outline of said line image and moving said point as desired thereby creating a different boundary for said line image; and
means for editing said line image by modifying a boundary outline of said line image, wherein said line image is created so that it can be edited easily at any point to change the width.

* * * * *